United States Patent [19]

Hörmann

[11] Patent Number: 5,730,027

[45] Date of Patent: Mar. 24, 1998

[54] DRIVE MECHANISM FOR AN OBJECT TO BE DRIVEN BACK AND FORTH, IN PARTICULAR A DOOR PANEL

[75] Inventor: Michael Hörmann, Marienfeld, Germany

[73] Assignee: Marantec Antriebs Und Steuerungstechnik GmbH & Co. Produktions KG, Marienfeld, Germany

[21] Appl. No.: 808,013

[22] PCT Filed: Nov. 9, 1994

[86] PCT No.: PCT/DE94/01313

§ 371 Date: Oct. 11, 1995

§ 102(e) Date: Oct. 11, 1995

[87] PCT Pub. No.: WO95/13446

PCT Pub. Date: May 18, 1995

Related U.S. Application Data

[63] Continuation of Ser. No. 481,343, Jul. 7, 1995, abandoned.

[30] Foreign Application Priority Data

Nov. 9, 1993 [DE] Germany ............... 43 38 219.3

[51] Int. Cl.[6] .................................................. E05F 15/16
[52] U.S. Cl. ................... 74/89.22; 160/188; 49/360
[58] Field of Search .................... 74/89.2, 89.22; 49/360; 160/331, 344, 188

[56] References Cited

U.S. PATENT DOCUMENTS

| 3,153,942 | 10/1964 | Staak .................... 160/331 X |
| 5,351,441 | 10/1994 | Hörmann ..................... 49/362 |

FOREIGN PATENT DOCUMENTS

| 3837149 | 5/1990 | Germany . |
| 4136119 | 3/1994 | Germany . |
| 482622 | 1/1970 | Switzerland ............ 160/188 |
| 1188672 | 4/1970 | United Kingdom . |

*Primary Examiner*—Richard M. Lorence
*Attorney, Agent, or Firm*—Robert S. Lipton, Esq.; Lipton, Weinberger & Husick

[57] ABSTRACT

Drive mechanism for a drive carrier (17) which is drivable for back and forth movement along a guide rail (10), which is connectable to a correspondingly drivable object, having a drive system (1) with a reducing gear (3) and output head (4) and having a drive web (11) driven by same and connectable to the drive carrier which is looped over a turn-around device intended to be located at the end of guide rail (10) facing away from drive system (1), which drive mechanism is so constructed for the purpose of space-saving storage and/or transportation and also orderly final assembly after connection of the guide rails without the risk of a faulty drive web run, in such manner that the drive system (1) or its output head (4) has a storage section (8) in which the drive web (11), looped over the output head and dimensioned for the total guide rail length, shortened in its lengthwise direction by wavelike folds (13,14) is contained in a small space, together with the turn-around device (12), to which storage section (8) the guide rail is connected at the installation site, and in which the turn-around device (12) can be slid into the operating position at the corresponding end of the guide rail (10) and there fastened, while entraining without twisting the drive web (11) which is thereby extended in the longitudinal direction of the guide rail.

8 Claims, 1 Drawing Sheet

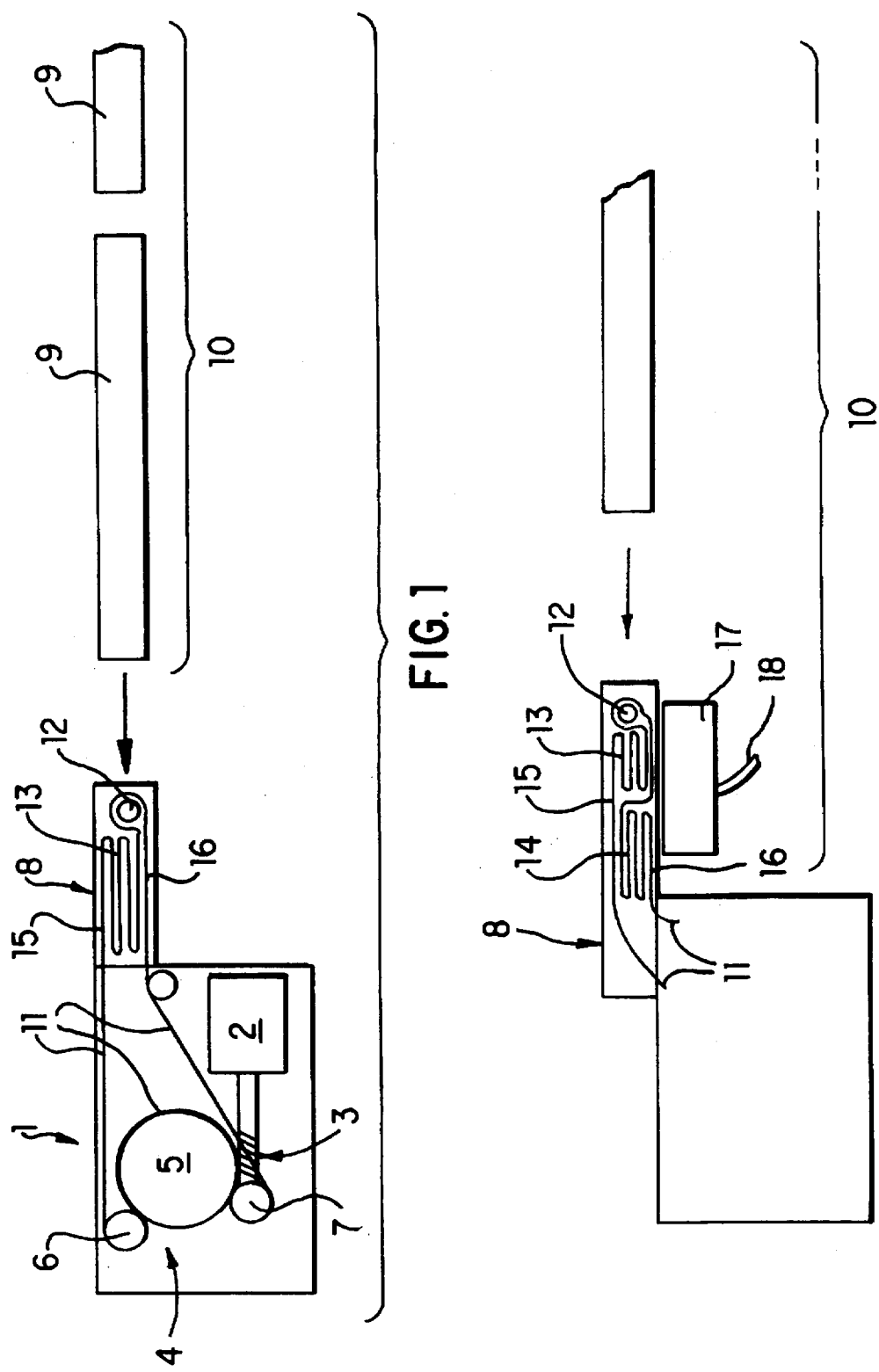

DRIVE MECHANISM FOR AN OBJECT TO BE DRIVEN BACK AND FORTH, IN PARTICULAR A DOOR PANEL

This is a continuation of application Ser. No. 08/481,343 filed on Oct. 15, 1995, now abandoned.

The invention relates to a drive mechanism for a drive carrier or the like, adapted to be driven back and forth along a guide rail over a preferably linear path, which can be connected to an object which is to be driven back and forth—in particular a door panel or similar building closure, e.g. an overhead moveable single panel or segmented door—having a preferably electrically motorized drive assembly—drive motor with reducing gear and drive head, the latter particularly in the form of a friction wheel element—and having a drive web, preferably in the form of a flexible textile-belt band and adapted to be connected to the drive carrier—which is looped over a turn-around device, preferably a turn-around roller, and is adapted to be attached to the end of the guide rail remote from the drive mechanism.

It is desired to store and/or to transport drive mechanisms of the above type in the most space-saving manner possible and to complete them as simply as possible at their destination, which means in particular that the guide rail, whose length is dimensioned to the length of the drive path to be traversed, is connected only at the operating site. Of course, this should take place in as simple as foolproof a manner as possible, to which end the drive, prepared for storage and transportation in a small space, is preassembled as much as possible.

Most drive webs, such as the well-known type using chains, but also cable-like drives, are "sensitive" to twisting about their longitudinal axis, which can be readily understood with respect to chains and which, with respect to cables, can cause at least changes in length. It is the case for chains used as a drive web, belt- or band-like drive webs are also sensitive to twisting, i.e. require level runs of web legs in order to provide orderly, long-lasting operation.

The object of the invention is to provide a drive mechanism of the initially described type, which makes possible a space-saving storage and/or transport configuration, and simultaneously an orderly final assembly after connection to the guide rail or guide rail segments, without incurring the risk of a faulty run of the drive web during assembly.

Starting with a drive mechanism having the initially described characteristics, this object is achieved in accordance with the invention by providing the drive mechanism, or its output head, with a storage section which receives, for storage and/or transport inside a small space, the drive web looped over the drive head and dimensioned to correspond to the entire length of the guide rail and shortened in its lengthwise direction by wavelike folds next to the turn-around roller over which that drive web is also looped. The guide rail, which is of one piece or in several pieces which follow one another in the lengthwise direction, is adapted to be connected to the storage section at the installation site, the turn-around device being moveable into its operating position at the end of the guide rail facing away from the drive mechanism and there made fast, while extending the drive web without twisting in the lengthwise direction of the guide rail.

The drive mechanism of the invention is therefore characterized in that a storage section, with the drive assembly, or with its drive head if the actual drive motor and possibly the reduction gear is not preassembled for storage and/or transport, stores the drive web shortened with respect to its operating length, e.g. folded in zigzag or wavy form, in meander-like form or the like, in a correspondingly small space and preassembled on the one hand with the drive head and on the other hand with a turn-around device which, when ready for use, is to be located at that end of the guide rail connected to the drive mechanism which faces away from the storage section. Basically, the storage section can have any desired configuration, but in a particularly preferred embodiment it constitutes the beginning portion of the guide rail at the drive assembly end, which becomes fully available at the utilization site after addition of an appropriately long segment which can also be composed of several shorter segments, adequate for the prevailing requirements. Especially in this latter embodiment, a drive carrier, which is connected to the drive web and moved back and forth by same, can also be preassembled, i.e. already positioned at the storage section during storage and/or transportation. During operation, the carrier then moves via the connection between the store and the adjacent guide rail segment.

Due to the above construction, the drive unit with the highest degree of preassembly can be made ready to operate, after connection of a single or multi-segment guide rail of the appropriate length at the installation site, by simply pulling the turn-around device out of the storage device along the operating length of the guide rail while extending the web and making it fast at the end of the guide rail remote from the drive. In so doing, the turn-around device—particularly in the form of a turn-around roller—can be provided with shaft bearing supports which serve as fasteners at the end portion of the guide rail and which can also be fastened for transportation inside the storage section. It then suffices merely to detach it from the storage section and to attach it at the end portion of the guide rail after appropriate displacement of the turn-around device from the section along the length of the rail.

Due to the shortened arrangement of the drive web, particularly of belt-or band-like form, in wave-like configuration or the like, the drive web is present untwisted inside the storage section and automatically assumes its proper untwisted operating orientation following displacement of the turn-around device into the operating position, the assumption being that, during its displacement in the guide rail, the turn-around device is not rotatable about an axis which is perpendicular to its shaft axis and extends lengthwise of the rail.

Basically, the construction of the drive mechanism according to the invention is suitable for all kinds of drive systems which use drive webs that are sensitive to twisting, but especially for those which use a belt-or band-like drive web. These drive mechanisms use a drive head with a roller arrangement that frictionally engages the drive web.

In what follows, the invention is explained in more detail by means of the embodiments shown in the drawings. There is shown in FIG. 1 a diagrammatic cross-sectional elevation of a storage device and an adjacently indicated rail segment to be connected at the installation site;

FIG. 2 an additional embodiment, illustrated diagrammatically and in cross-section, of a modified storage section.

FIG. 1 shows a drive system which is collectively designated as 1, which includes an electric motor 2, a reducing gear 3 in the form of a worm gear drive and an output head collectively designated as 4, the latter including a friction roller 5 and two guide elements 6 and 7, so that the drive web collectively designated as 11 is guided by means of guide elements 6 and 7 around a large circumferential portion (significantly greater than 180° degrees) of friction roller 5. From output head 4 the drive web 11 extends into a storage section 8 located ahead of it in the direction of the guide rail, to which there can be connected at the installation site a guide rail collectively designated as 10—here represented by one of several short rail segments 9. The drive web which forms an endless loop is a turn-around device 12 positioned in an end portion of the storage section 8 facing away from the output head 4.

At the installation site, the guide rail 10—if appropriate by use of short rail segments, which are connectable to each other in succession, e.g. through socket-shaped overlaps—the turn-around device 12 is slid, with accompanying extension of the drive web 11, out of the storage section 8 and to the end portion of guide rail 10, and in essence without changing the relative position of the shaft of the turn-around device relative to the lengthwise direction of the guide rail, so that the turn-around device is sure to reach its operating position with the drive web in the preassembled position in folded, shortened stored form inside the storage section, whereby there is automatically assured the correct orientation of the drive web, even in its extended operating condition.

In FIG. 1, the configuration of the storage section 8 is left open, it being only necessary that connection of the guide rail be possible in such manner that the turn-around device can be displaced to the end portion of guide rail 10 facing away from drive system 1 without disturbing the previously described relative orientation. In so doing, there can also be prepositioned at the storage section a drive carrier to which the object to be displaced can be connected and which is firmly attached to the belt.

In FIG. 2, the storage section has essentially the same cross-sectional shape as the guide rail which is to be connected to it and constitutes an initial segment of the entire rail length required at the installation site. This makes it possible to provide drive carrier 17 and connecting member 18 for the unillustrated object to be moved, e.g. a door panel, at its starting location at storage section 8, so that, after connection of the additional guide rail segment required at the installation site, the guide rail collectively designated as 10 and consisting of storage section 8 and guide rail segment, is available for the displacing of the drive carrier via the connection point.

In the exemplary embodiment according to FIG. 1, there was stored in shortened form by means of folds 13 only one of the legs, i.e. 15, of the drive web 11, namely as shown with the wavy configuration approximately perpendicular to the lengthwise direction of the guide rail. It will be readily understood that such a wavy configuration can also be configured differently, e.g. rotated by 90° degrees, i.e. with the progressive wave configuration pointing in the lengthwise direction of the guide rail. In the illustrative embodiment according to FIG. 2, both legs 15 and 16 of the drive web 11 are shortened through folding, as shown at 13 and 14.

By virtue of the construction of the drive system illustrated in FIG. 1, and particularly of the worm configuration in the output portion of the motor shaft and the worm gear attached coaxially and co-rotationally to friction roller 5, there is obtained overall a very compact construction of the drive system with storage section, so that the storage and/or transportation is or are correspondingly facilitated.

I claim:

1. Drive mechanism for a drive carrier (17) adapted to be driven back and forth along a guide rail (10) over a generally linear path, the drive carrier is adapted to be connected to an object which also is to be driven back and forth having a motorized drive assembly (1), said motorized drive assembly including a drive motor (2) with reducing gear (3), a drive head (4), and a drive web (11) driven by same and adapted to be connected to the drive carrier (17) at a connection point, the drive web is looped over a turn-around device (12), the turn-around device adapted to be attached to the end of the guide rail remote from the drive mechanism, characterized in that the drive assembly (1) has a storage section (8) which receives, for storage, the drive web (11);

said drive web being looped over the drive head (4) and the turn-around device (12), said drive web dimensioned to correspond to the entire length of the guide rail and shortened in its lengthwise direction by wavelike folding (13, 14) for storage in said storage section (8), said storage section (8) is adapted to be connected to the guide rail at the site of installation, the turn-around device (12) adapted to slide into its operating position at the end of the guide rail (10) facing away from the drive assembly (1) and is there fastenable, while entraining the drive web (11) without twisting.

2. Drive mechanism according to claim 1, characterized in that the storage section (8) takes the shape of an initial segment of the guide rail (9;10), the guide rail is adapted to be connected thereto and the storage section conforms to the cross-section of its carrier guidance and drive web receptacle and, in its storage configuration contains the drive carrier (17) within the storage section (8).

3. Drive mechanism according to claim 1, characterized in that the drive carrier (17), after connection of the guide rail (9;10), is movable via the connection point back and forth in the operating configuration so produced, so that the storage section (8) constitutes a portion of the total useable operating guide rail length.

4. Drive mechanism according to claim 1, characterized in that during return of the drive web (11) extending from drive assembly (1) to the turn-around device (12) constructed generally in endless loop form, both legs of the web (15,16) are maintained while in storage in wavelike folds (13,14) correspondingly shortened in the lengthwise direction of the guide rail (10).

5. Drive mechanism according to claim 1, characterized in that the wavy path of the folds (13, 14) of the drive web (11) is oriented variously in their stored condition generally perpendicular to or parallel to the lengthwise direction of the rail, or in a mixture thereof.

6. Drive mechanism according to claim 1, characterized in that the drive head (4) of the drive assembly (1) has a friction roller (5) and two guide elements (6,7), of which at least one of said guide elements is oriented in the exit direction of the associated drive web leg (15 or 16).

7. Drive mechanism according to claim 6, characterized in that the drive assembly has an electric motor (2), said electric motor is connected to a worm drive (3) having a worm gear that engages the friction roller (5) and fixed for rotation with same.

8. Drive mechanism according to claim 1, characterized in that the drive web (11) is adapted to be fastened to the drive carrier (17) at an attachment point along its endless loop which is variable and which corresponds to the guide rail (10) length.

* * * * *